(12) United States Patent
Chew

(10) Patent No.: US 9,037,607 B2
(45) Date of Patent: May 19, 2015

(54) UNSUPERVISED ANALYTICAL REVIEW

(71) Applicant: Peter Alexander Chew, Albuquerque, NM (US)

(72) Inventor: Peter Alexander Chew, Albuquerque, NM (US)

(73) Assignee: GALISTEO CONSULTING GROUP INC., Albuquerque, NM (US)

( * ) Notice: Subject to any disclaimer, the term of this patent is extended or adjusted under 35 U.S.C. 154(b) by 307 days.

(21) Appl. No.: 13/829,053

(22) Filed: Mar. 14, 2013

(65) Prior Publication Data

US 2014/0279301 A1    Sep. 18, 2014

(51) Int. Cl.
*G06F 17/30* (2006.01)
*G06Q 40/00* (2012.01)

(52) U.S. Cl.
CPC .......... *G06Q 40/10* (2013.01); *G06F 17/30578* (2013.01)

(58) Field of Classification Search
CPC ................................................ G06F 17/30864
USPC ............ 705/30; 707/1, 6, 748, 706, 776, 780
See application file for complete search history.

(56) References Cited

U.S. PATENT DOCUMENTS

| 7,587,348 | B2 | 9/2009 | Liao |
| 8,290,961 | B2 | 10/2012 | Chew |
| 8,639,596 | B2 | 1/2014 | Chew |
| 8,706,758 | B2 | 4/2014 | Chew |
| 2005/0222928 | A1 | 10/2005 | Steier |
| 2005/0222929 | A1 | 10/2005 | Steier |
| 2008/0249820 | A1 | 10/2008 | Pathria |
| 2009/0234899 | A1 | 9/2009 | Kramer |
| 2010/0185685 | A1* | 7/2010 | Chew et al. .................... 707/803 |
| 2011/0004580 | A1* | 1/2011 | Varghese ......................... 706/47 |
| 2011/0040983 | A1* | 2/2011 | Grzymala-Busse et al. .. 713/189 |
| 2012/0259753 | A1 | 10/2012 | Orad |
| 2013/0031633 | A1 | 1/2013 | Honig |
| 2013/0046786 | A1 | 2/2013 | Fabbri |
| 2013/0054603 | A1 | 2/2013 | Birdwell |
| 2014/0058763 | A1* | 2/2014 | Zizzamia et al. ................. 705/4 |
| 2014/0149806 | A1* | 5/2014 | Khalastchi et al. ............. 714/49 |

* cited by examiner

*Primary Examiner* — Hunter Wilder

(57) ABSTRACT

Disclosed is a method generally applicable to any financial dataset for the purposes of: (1) determining the most important patterns in the given dataset, in order of importance; (2) determining any trends in those patterns; (3) determining relationships between patterns and trends; and (4) allowing quick visual identification of anomalies for closer audit investigation. These purposes generally fall within the scope of what in financial auditing is known as 'analytical review'. The current method's advantages over existing methods are that is fully independent of the financial data subject to analysis, requires no background knowledge of the target business or industry, and is both scalable (to large datasets) and fully scale-invariant, requiring no a priori notion of financial materiality. These advantages mean, for example, that the same method can be by an external auditor for many different clients with virtually no client-specific customization, directing his attention to the areas where more detailed audit investigation may be required. Compared with existing methods, the current method is extremely flexible, and because it requires no a priori knowledge, saves significant time in understanding the fundamentals of a business.

19 Claims, 5 Drawing Sheets

FIG. 1

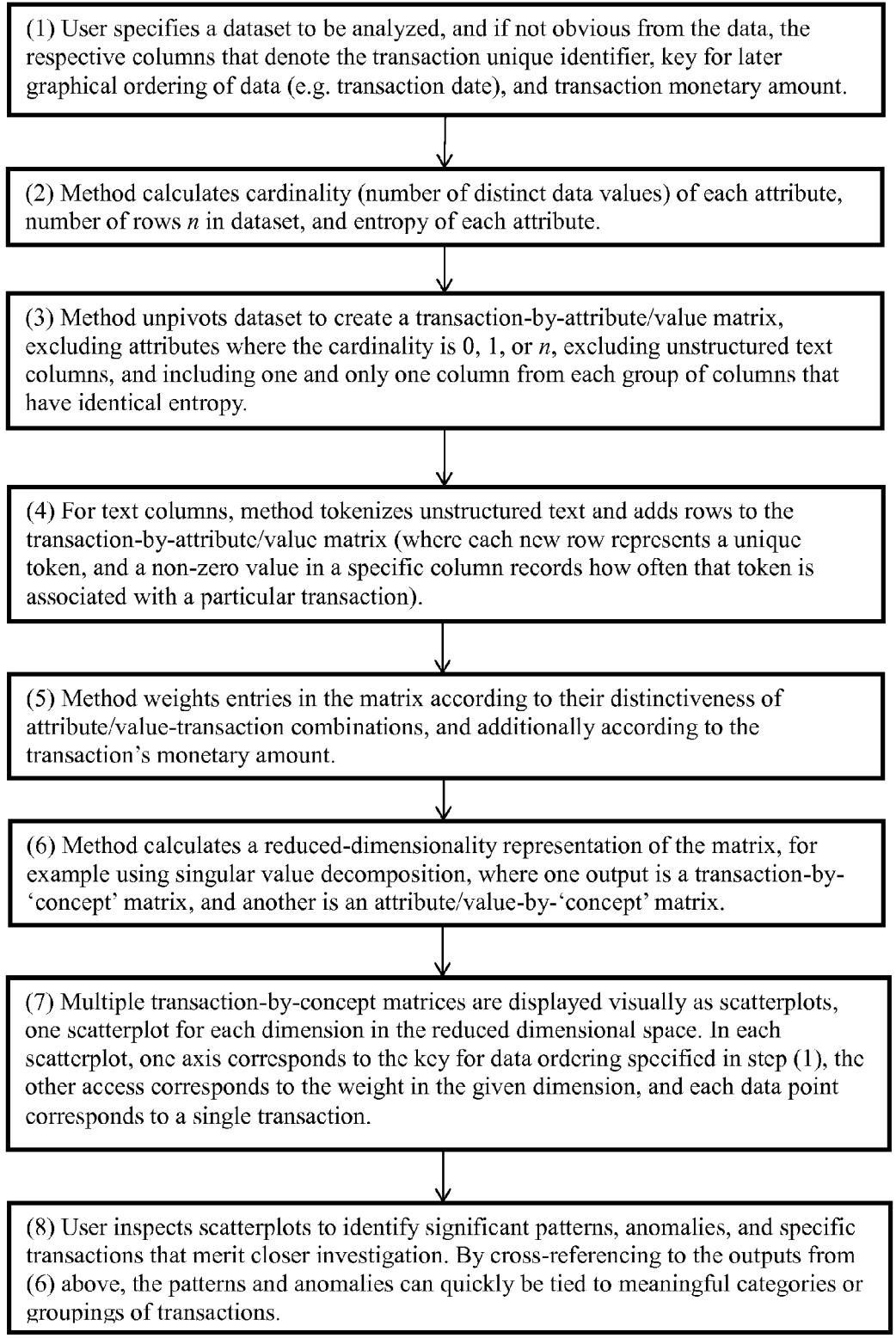

(1) User specifies a dataset to be analyzed, and if not obvious from the data, the respective columns that denote the transaction unique identifier, key for later graphical ordering of data (e.g. transaction date), and transaction monetary amount.

(2) Method calculates cardinality (number of distinct data values) of each attribute, number of rows $n$ in dataset, and entropy of each attribute.

(3) Method unpivots dataset to create a transaction-by-attribute/value matrix, excluding attributes where the cardinality is 0, 1, or $n$, excluding unstructured text columns, and including one and only one column from each group of columns that have identical entropy.

(4) For text columns, method tokenizes unstructured text and adds rows to the transaction-by-attribute/value matrix (where each new row represents a unique token, and a non-zero value in a specific column records how often that token is associated with a particular transaction).

(5) Method weights entries in the matrix according to their distinctiveness of attribute/value-transaction combinations, and additionally according to the transaction's monetary amount.

(6) Method calculates a reduced-dimensionality representation of the matrix, for example using singular value decomposition, where one output is a transaction-by-'concept' matrix, and another is an attribute/value-by-'concept' matrix.

(7) Multiple transaction-by-concept matrices are displayed visually as scatterplots, one scatterplot for each dimension in the reduced dimensional space. In each scatterplot, one axis corresponds to the key for data ordering specified in step (1), the other access corresponds to the weight in the given dimension, and each data point corresponds to a single transaction.

(8) User inspects scatterplots to identify significant patterns, anomalies, and specific transactions that merit closer investigation. By cross-referencing to the outputs from (6) above, the patterns and anomalies can quickly be tied to meaningful categories or groupings of transactions.

FIG. 2

| account | date | description | $ | ID |
|---|---|---|---|---|
| XY001 | 6/11/03 | Cash disbursement to J. Brahms | -50.00 | B1 |
| XY001 | 7/24/03 | Cash disbursement Wolfgang Mozatr 506221A | -50.00 | B2 |
| PQ002 | 2/2/09 | Payment to Emanuel Bach 0034X078 Schreberstr. 14, 04109 Leipzig | -70.00 | B3 |

FIG. 3

| Attribute-value | B1 | B2 | B3 |
|---|---|---|---|
| {[account], 'XY001'} | 1 | 1 | |
| {[account], 'PQ002'} | | | 1 |
| {[date], '6/11/13'} | 1 | | |
| {[date], '7/24/03'} | | 1 | |
| {[date], '2/2/09'} | | | 1 |
| 'Cash' | 1 | 1 | |
| 'disbursement' | 1 | 1 | |
| 'to' | 1 | | 1 |
| 'J' | 1 | | |
| 'Brahms' | 1 | | |
| 'Wolfgang' | | 1 | |
| 'Mozatr' | | 1 | |
| '506221A' | | 1 | |
| '0034X078' | | | 1 |
| 'Bach' | | | 1 |
| 'schreberstr' | | | 1 |
| 'emanuel' | | | 1 |
| '4109' | | | 1 |
| 'leipzig' | | | 1 |
| 14 | | | 1 |
| Payment | | | 1 |

FIG. 4

| PQ002 | 2/2/09 | Payment to Emanuel Bach 0034X078 Schreberstr. 14, 04109 Leipzig | -70.00 |

$$\log \frac{p(x,y)}{p(x)p(y)} = \log \frac{p(x\mid y)}{p(x)}$$

| Attribute-value | Count | PMI Weight |
| --- | --- | --- |
| '0034X078' | 1 | 4.112 |
| 'Bach' | 1 | 4.012 |
| 'schreberstr' | 1 | 3.233 |
| 'emanuel' | 1 | 3.011 |
| '4109' | 1 | 1.688 |
| 'leipzig' | 1 | 1.381 |
| {[account], 'PQ002'} | 1 | 1.022 |
| {[date], '2/2/09'} | 1 | 0.546 |
| 14 | 1 | 0.072 |
| Payment | 1 | 0.067 |
| To | 1 | 0.044 |

FIG. 6

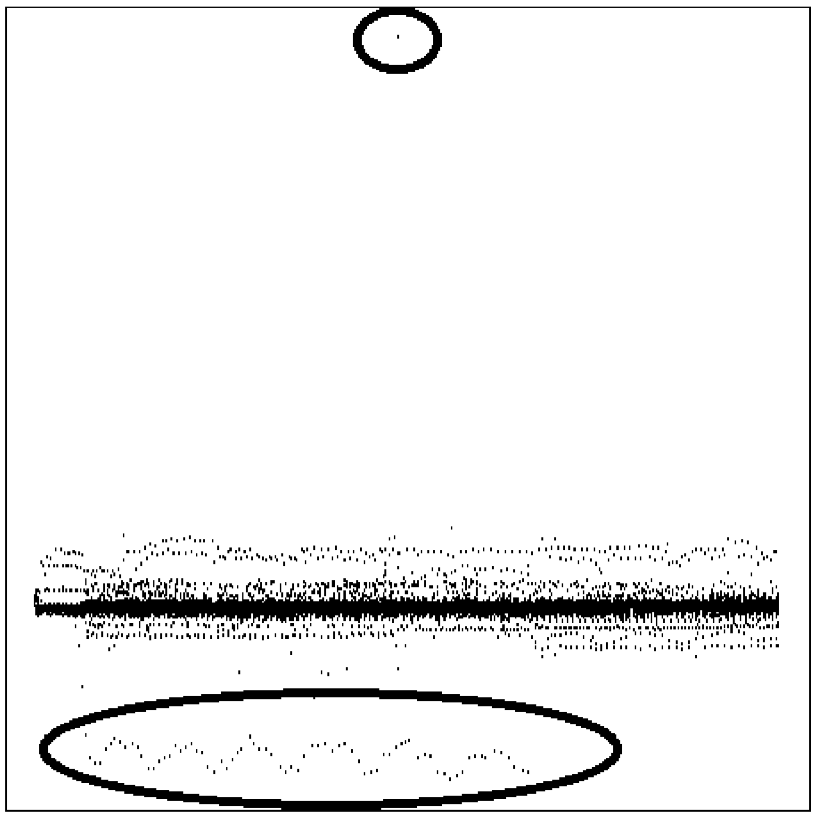

FIG. 7

| Dimension | Weight | TrnID | VendorID | Description | TrnDate |
|---|---|---|---|---|---|
| 1 highest ranked transaction in this dimension (shown at top of scatterplot) | | | | | |
| 14 | 0.3020 | 21496 | 947 | Sale of 100 Main Street | 6/21/2007 |
| 14 | ... | ... | ... | ... | ... |
| 10 lowest ranked transactions in this dimension (shown at bottom of scatterplot) | | | | | |
| 14 | -0.0922 | 22846 | 270 | Gas/electric bill dated 1/28/2008 | 2/9/2008 |
| 14 | -0.0901 | 23039 | 270 | Gas/electric bill dated 02/26/2008 | 3/9/2008 |
| 14 | -0.0891 | 22689 | 270 | Gas/electric bill dated 12/31/2007 | 1/14/2008 |
| 14 | -0.0886 | 20412 | 270 | Gas/electric bill dated 01/03/2007 | 1/16/2007 |
| 14 | -0.0885 | 16065 | 270 | Gas/electric bill dated 1/3/2005 | 1/15/2005 |
| 14 | -0.0885 | 22520 | 270 | Gas/electric bill dated 11/29/2007 | 12/11/2007 |
| 14 | -0.0884 | 25141 | 270 | Gas/electric bill dated 1/23/2009 | 2/6/2009 |
| 14 | -0.0882 | 18139 | 270 | Gas/electric bill dated 01/03/2006 | 1/16/2006 |
| 14 | -0.0879 | 20564 | 270 | Gas/electric bill dated 02/01/2007 | 2/13/2007 |
| 14 | -0.0878 | 23197 | 270 | Gas/electric bill dated 3/27/2008 | 4/8/2008 |

UNSUPERVISED ANALYTICAL REVIEW

CROSS REFERENCE TO RELATED APPLICATIONS

This application is a Continuation-in-Part (CIP) of U.S. patent application Ser. No. 13/385,494, filed Feb. 20, 2012, the contents of which are herein incorporated by reference.

BACKGROUND OF THE INVENTION

1. Field of the Invention

The present invention relates to the field of financial auditing. In financial auditing, one of the first steps is for the auditor to perform analytical review, which is defined as 'an auditing process that tests relationships among accounts and identifies material changes; it involves analyzing significant trends for unusual change and questionable items'. Analytical review is also a powerful auditing technique in that it is often the quickest way to find anomalies. The present invention is a method for unsupervised analytical review which could be used to detect, among other things, fraudulent financial activity. The fact that the method is 'unsupervised' means that it learns and detects patterns and anomalies directly from whatever accounting data is being analyzed, rather than having to rely on extrinsic experience from training data, or insights or a priori knowledge on the part of the auditor. In this, it is distinguished from the current state of the art in auditing. An unsupervised approach can be used regardless of the content, data format, size, or level of materiality of the accounting dataset. It uses principles from information theory and data mining automatically to find patterns and anomalies, and to compute empirical similarities between transactions. An auditor is thus enabled to make sense of large datasets quickly and without time-consuming analysis which must be customized to each new problem or dataset.

2. Description of the Prior Art

U.S. Pat. No. 7,587,348 describes a system and method of detecting mortgage related fraud. The method scores transactions based on a model created from historical mortgage transaction data. The score is used to indicate the likelihood of fraud.

Because the system and method is based on creating a model from historical data, it is an example of a supervised learning technique. A technique of this sort will work only when historical data is available, and when the historical data is labeled based on prior experience of which transactions were fraudulent. Three disadvantages of supervised techniques are: (1) building up data of this type is time-consuming and costly; (2) the labeled data is only useful (a) to the extent the historical data and the current data relate to the same problem (e.g. mortgage fraud detection), (b) to the extent the historical and current data are structured similarly, and (c) to the extent the historical data is even available, which as a rule it is not in audit situations. The current method, in contrast, is unsupervised, which means it applies more generally and without the above-mentioned restrictions of supervised techniques.

U.S. Patent Application 2013/0046786 discloses a system for explanation-based auditing of medical records data. This invention uses a template database containing a plurality of explanation templates, and uses this automatically to identify an explanation for user access to stored information.

Because the system relies on the existence of a template database, it is again an example of a supervised technique. Only those explanations that exist in the database can be assigned to potential anomalies. If the list of explanations is not relevant to a new dataset, then the system cannot be used. The focus of the current method is instead to tease out patterns and associated explanations directly from the data, needing no a priori data or lists.

U.S. Patent Applications 2005/0222928 and 2005/0222929 disclose systems and methods for investigation of financial reporting information. These systems and methods include analyzing financial data statistically and modeling it over time, comparing actual data values with predicted data values to identify anomalies in the financial data. The anomalous financial data is then analyzed using clustering algorithms to identify common characteristics of the various transactions underlying the anomalies. The common characteristics are then compared with characteristics derived from data known to derive from fraudulent activity, and the common characteristics are reported, along with a weight or probability that the anomaly associated with the common characteristic is an identification of risks of material misstatement due to fraud.

Because this method compares data with 'data known to derive from fraudulent activity', it is another example of a supervised learning technique. For this reason it suffers from the same drawbacks listed in paragraph [0004] above compared to the current method which is fully unsupervised.

U.S. Patent Application 2013/0031633 discloses a system and methods for adaptive model generation for detecting intrusion in computer systems. The system and methods are compatible with unsupervised anomaly detection techniques; however, the field of the invention is the detection of anomalies in a computer system rather than financial data.

U.S. Patent Application 2013/0031633 does not teach how to apply its system and methods to the field of financial auditing. A critical component of the latter is consideration of financial materiality. In auditing, materiality is a concept relating to the importance or significance of an amount, transaction, or discrepancy. Broadly, the greater the monetary value of an amount, transaction or discrepancy (taken within the context of the business as a whole), the more likely it is to be material. The current method integrates the concept of materiality along with other unsupervised techniques in a scale-invariant fashion. Critically, the scale-invariant approach means that the method remains fully unsupervised. In fact, an intrinsic virtue of the current method is that it highlights the patterns and anomalies which are most material in a financial sense to the data that is the target of analysis, without the user needing to provide any extrinsic knowledge or experience as prior input.

U.S. Patent Application 2012/0259753 discloses a system and method for managing collaborative financial fraud detection logic. Detection logic is uploaded by users to a network and can be shared to detect risks which may be related to financial transactions.

Because this system and method relies on the logic being uploaded to the network by users, it is an example of a system which relies on extrinsic knowledge or experience to detect fraud or other anomalies in data. The current system, because it detects patterns directly from data, is fully unsupervised and therefore more generally applicable.

U.S. Patent Application 2013/0054603 discloses a method and apparatus for classifying known specimens and media using spectral properties and identifying unknown specimens and media. Detection of patterns of activity of fraud is mentioned as one area where this method and apparatus may be applicable. The method and apparatus require a group of reference specimens.

The requirement for a 'group of reference specimens' again makes this an example of a supervised learning technique, regardless of the applicability or otherwise to financial transactions. The current method does not require any extrinsic data and is therefore more generally useful.

U.S. Patent Application 2008/0249820 discloses an approach for assessing inconsistency in the activity of an entity, as a way of detecting fraud and abuse, using service-code information available on each transaction and applying an unsupervised data mining technique, dimensionality reduction as used in text analysis, to find inconsistencies.

This method, like the current method, uses dimensionality reduction to find anomalies. However, the approach in U.S. Patent Application 2008/0249820 is specific to fraud detection, while the current method teaches how to use dimensionality reduction to fulfill a much broader set of audit purposes, including detecting not only anomalies (which might or might not be related to fraud), but also trends and material patterns. Further, regarding the detection of fraud or anomalies, U.S. Patent Application 2008/0249820 teaches how to look at correlations and consistency between (medical) providers and patients. This assumes a requirement for data from multiple providers, while the current method requires only data from a single entity or business, which means that it could equally well be applied to a business in any industry. In the current method, anomalies can be found even when there are no peer-group businesses available for comparison.

U.S. Patent Application 2009/0234899 discloses systems and methods for dynamic anomaly detection. The invention relates to the process of detecting anomalies in heterogeneous, multivariate data sets that vary as functions of one or more independent variables.

U.S. Patent Application 2009/0234899 does not teach how to apply the systems and methods to financial data, and as mentioned in paragraph [0009] above, specifically does not deal with the problem of incorporating financial materiality. Furthermore, the systems and methods discover anomalies in relation to independent variables, while the current method discovers anomalies intrinsic to the target data. Finally, U.S. Patent Application 2009/0234899 teaches systems and methods only for anomaly detection, while the current method is a more general method allowing data exploration, not just the identification of anomalies.

SUMMARY OF THE INVENTION

The present invention is a computer-implemented method for analytical review and anomaly detection capable of identifying patterns and anomalies in any accounting dataset, without any a priori notion of what the patterns and anomalies might be or what the structure or content of the accounting dataset is. It does not rely on data being provided in any specific template or format, and can be used with structured data (for example, transaction dates or transaction reference numbers provided in the fields of a database or spreadsheet) or unstructured text (for example, text data such as 'free-form' transaction descriptions, in any human language, which might also be provided in the fields of a database or spreadsheet). The invention uses principles from information theory, probability theory, natural language processing, data mining, statistics, and linear algebra. The invention uses a technique from data mining, along with an information-theoretic and algebraic approach, to characterize the entire population of transactions from the dataset of interest as a matrix in a common, geometrically-defined, attribute/value space, where one mode (rows or columns) corresponds to the accounting transactions and the other corresponds to the transaction attribute/values. The matrix is then subjected to a dimensionality reduction technique to identify its principal components, corresponding to the most important clusters or groupings of transactions (such as 'payroll transactions') in the dataset. Trends and patterns in these groups are then presented to the user via graphical output, so that the user can quickly see which trends, groups and anomalies are most material. In summary, the present invention can be used with virtually no intervention or extrinsic knowledge on the part of the auditor quickly to discover trends and anomalies, and thereby understand the key financial drivers of a business, saving a large amount of labor on the part of the auditor.

It is therefore a primary object of the present invention to provide a method for analytical review and anomaly detection which will significantly streamline the process of financial auditing at a significant savings, and enable an auditor more quickly to learn about the key trends in any business and discover any anomalies that merit closer investigation.

It is another object of the present invention to provide a method for analytical review and anomaly detection which can easily be adapted to use with transactional data in different formats, to eliminate the necessity for a user of the invention to manipulate data into a required format before it can be reconciled, saving the user of the invention time in its use.

It is a further object of the present invention to provide a method for analytical review and anomaly detection where the invention automatically determines which trends, patterns, and anomalies are material, saving the user time and labor and eliminating requirements for user knowledge of the content or structure of the data. This could be particularly useful for an external auditor who is constantly required to audit different businesses' financial data, or for auditing businesses where there is a large volume of data and where it is hard to separate the 'signal' from the 'noise'.

It is a further object of the present invention to provide a method for analytical review and anomaly detection where the user of the invention is not required to develop heuristics or business rules, or have virtually any knowledge of the structure of the business's accounting data, in order for analytical review and anomaly detection to be made possible, again saving the user of the invention time in its use, and eliminating requirements for user expertise.

It is still a further object of the present invention to provide a method for analytical review and anomaly detection which can deal with unstructured text, in cases where key information on each transaction may be included within a transaction description rather than in structured data fields; the invention does not make any presumptions about which human language or character set (e.g. English, French, Russian) is used to encode the unstructured text.

It is still a further object of the present invention to provide a method for analytical review and anomaly detection which supports identification of anomalies or patterns of interest to particular transactions to direct further investigation by the auditor.

These and other objects of the present invention will become apparent to those skilled in this art upon reading the accompanying description, drawings, and claims set forth herein.

BRIEF DESCRIPTION OF THE DRAWINGS

Non-limiting and non-exhaustive embodiments of the invention are described with reference to the following figures.

FIG. 1 shows an overview of the process used for unsupervised analytical review and anomaly detection in financial audits.

FIG. 2 shows a miniature example dataset that might be used as input for the present invention. Note that the present invention is designed to work with much larger datasets, and to be scalable, since the larger the dataset, the greater the benefit the present invention will provide.

FIG. 3 shows a sample transaction-by-attribute/value matrix can be constructed by unpivoting the data from the input dataset, then tokenizing the unstructured text from the same dataset. Here, the frequency of each attribute/value in given transactions is 1, but other frequencies could occur, for example if the same word occurred multiple times in a single text field for a single transaction.

FIG. 4 shows how attribute/values of transactions, here including both words from a text database column and attribute-values based on non-text database columns, may be weighted using the pointwise mutual information measure, rendering the transaction (in geometric terms) as a vector in multidimensional space. The weighted values replace the raw counts of FIG. 3. To these weights is also added a second weight depending on the monetary value of the transaction, which is how materiality is taken into account. The second weight is equal to the logarithm of the absolute value of the monetary amount.

FIG. 6 shows an example scatterplot for a single dimension—a larger version of the scatterplot in the second column from the left, and the third row from the top of FIG. 5 (dimension 14). The auditor can use this output to discern material patterns or anomalies, which will in turn allow directed further examination of the data. Two examples are circled in FIG. 6: (1) an anomaly at the top of the scatterplot (in this example, this is in fact a highly material and anomalous transaction related to closing on a property involving a large monetary amount), and (2) a cyclic pattern at the bottom of the scatterplot (in this example, the pattern relates to monthly utilities bills, and the fluctuation reflects the fact the bills are higher in winter than in summer). In some cases, a group (rather than just a single transaction) may appear anomalous, and a case like this the entire group may merit closer scrutiny, since a fraudster may unwittingly leave behavioral traces in a group of fraudulent transactions he/she creates that quickly become visually evident in the scatterplot.

FIG. 7 shows further how the output of dimensionality reduction can be used to help interpret the scatterplots. FIG. 7 shows an example of the top 1 and bottom 10 transactions, by weighting in dimension 14. Each row in FIG. 7 corresponds to a single data point in FIG. 6. These results clearly show that the data points at the bottom of FIG. 6 relate to utilities bills, and that the anomalous data point at the top of FIG. 6 relates to a closing on real estate. Once this is understood, the auditor is then in a better position to direct further investigation of individual transactions.

DETAILED DESCRIPTION OF THE INVENTION

1. Definitions

Figure 5:
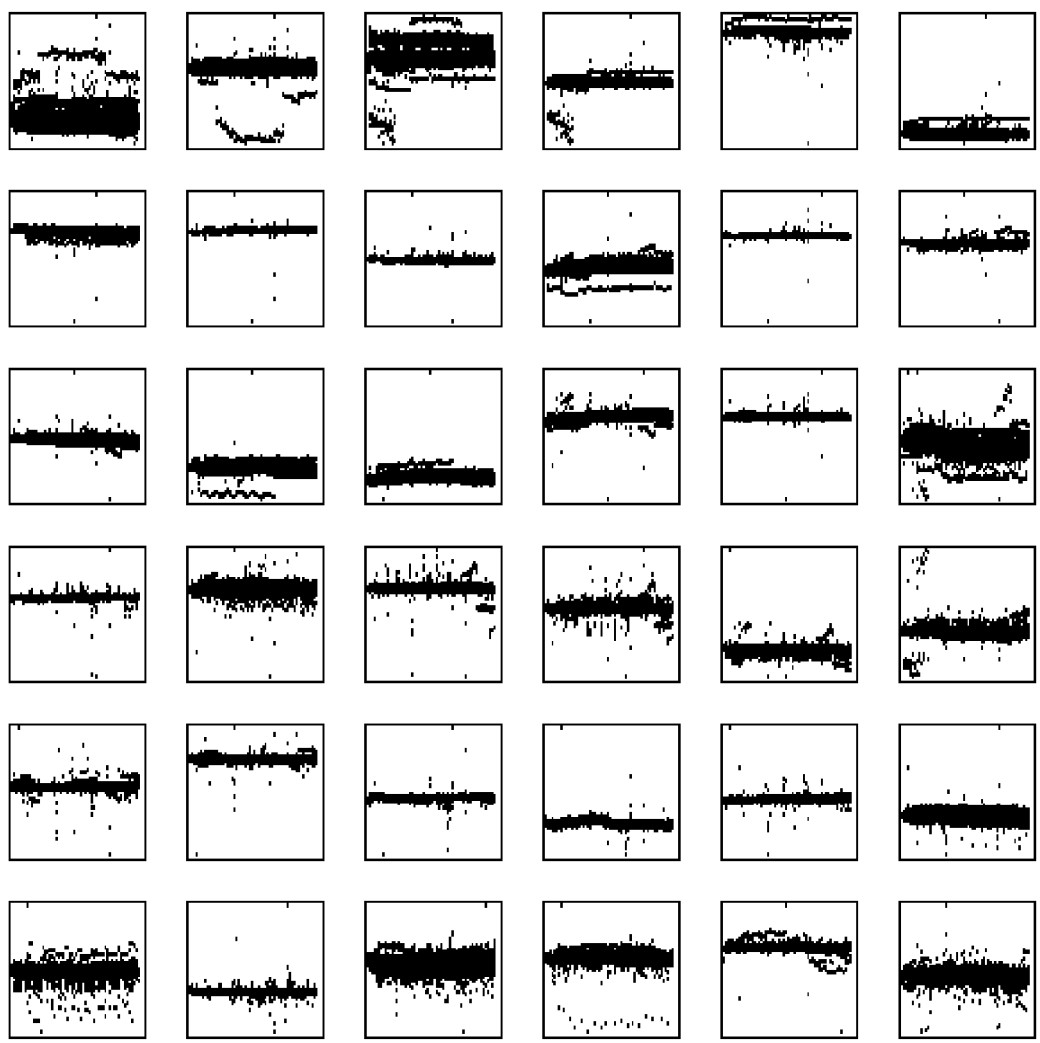
FIG. 5 shows how the output of dimensionality reduction (that is, reducing the dimensionality of the weighted transaction-by-attribute/value matrix) can be visualized using a single scatterplot for each dimension in the reduced space (in FIG. 5, 36 dimensions). In this example, the x-axis of each scatterplot corresponds to time (transaction dates) and the y-axis of each scatterplot corresponds to the weight transactions receive in the given dimension.

Key terms used herein are defined below, and illustrated further in the Drawings.

'Analytical review' as used herein shall have a meaning consistent with that of the phrase 'analytical procedures' used by the Auditing Standards Board (ASB) of the American Institute of Certified Public Accountants (AICPA) in Statement of Auditing Standards No. 56, 'Analytical Procedures' (SAS No. 56'). SAS No. 56 requires the use of analytical procedures in the planning and overall review stages of all audits. According to SAS No. 56, 'analytical procedures are an important part of the audit process and consist of evaluations of financial information made by a study of plausible relationships among both financial and nonfinancial data . . . . Particular conditions that can cause variations in these relationships include, for example, specific unusual transactions or events, accounting changes, business changes, random fluctuations, or misstatements.' The present invention is capable of identifying transactions or groups of transactions which meet the description of the example conditions just listed. SAS No. 56 further states that understanding financial relationships 'generally requires knowledge of the client and the industry or industries in which the client operates'. The purpose of the present invention, however, is to enable analytical review while minimizing the requirement for client-specific or industry-specific knowledge.

From [0036], it will be amply seen by one skilled in the art of auditing that detection of anomalies (such as unusual transactions or misstatements in a financial dataset) is an important goal of analytical review. It should also be noted that detection of financial anomalies could be done by an auditor outside the context of analytical review, for example as part of a fraud investigation. 'Anomaly detection' as used herein shall mean the identification of unusual financial transactions, groups of financial transactions, or financial trends, whether as part of analytical review or as a component of any other financial function or application.

'Materiality' as used herein shall have a meaning consistent with that used by the ASB of the AICPA in Statement of Auditing Standards No. 107, 'Audit Risk and Materiality in Conducting an Audit' (SAS No. 107'). SAS No. 107 states that materiality 'need[s] to be considered . . . in designing the nature, timing, and extent of audit procedures and in evaluating the results of those procedures'. According to SAS No. 107, 'the concept of materiality recognizes that some matters, either individually or in the aggregate, are important for fair presentation of financial statements in conformity with generally accepted accounting principles, while other matters are not important . . . . The auditor's responsibility is to plan and perform the audit to obtain reasonable assurance that material misstatements, whether caused by errors or fraud, are detected.' The present invention is capable of focusing the auditor's attention on material transactions, anomalies and trends rather than immaterial ones. SAS No. 107 further states that the discussion in Financial Accounting Standards Board (FASB) Statement of Financial Accounting Concepts No. 2 'recognizes that materiality judgments are made in the light of surrounding circumstances and necessarily involve both quantitative and qualitative considerations'. The present invention takes both quantitative and qualitative considerations into account by considering both the monetary amount, and the distinctiveness, of transactions in the context of all other transactions in a dataset.

'Dataset' as used herein shall mean a table of accounting data, for example a list of debits and credits as presented on a paper or downloaded bank statement, or data extracted from a database, accounting system, spreadsheet, or text file. The current invention is a method for analytical review and anomaly detection with a single dataset at a time.

'Transaction' as used herein shall mean a single row in a dataset associated with a monetary value, for example a single debit or credit entry on a bank statement. For example, 3 transactions are illustrated in FIG. 2 of the Drawings.

'Attribute' as used herein shall mean a characteristic of each transaction associated with a dataset column. Attributes can be referred to by the relevant column heading in square brackets. FIG. 2 of the Drawings illustrates [account], [date] and [description] attributes for the first dataset (not including the $ value and transaction unique identifier).

'Feature' as used herein shall mean a particular data value in a dataset, unassociated with any attribute. For example, '6/11/2003' and 'Brahms' may be features that occur in a dataset as illustrated in FIG. 2 of the Drawings.

'Attribute-value' and 'attribute/value' as used herein shall mean a pairing of an attribute and feature, i.e. a feature imbued with the semantics of the attribute it is associated with. For example, if for a particular transaction the [date] is '6/11/2003', then the attribute value could be denoted as {[date], '6/11/2003'} as illustrated in FIG. 3 of the Drawings.

'Monetary amount' and 'monetary value' as used synonymously herein shall mean a numerical value (usually expressed in currency), expressed as a positive amount, used to determine the financial significance, that is, materiality, of a particular transaction. Examples of monetary values illustrated in FIG. 2 of the Drawings are $50.00 and $70.00.

'Unstructured text attributes' as used herein shall refer to attributes where the attribute-values combine multiple terms (or words) which may individually be of use in distinguishing and grouping transactions. The [description] attribute in FIG. 2 of the Drawings is an example of an unstructured text attribute, because the attribute-value of the transaction identified as B1 is 'Payment to Emanuel Bach 0034×078 Schreberstr. 14, 04109 Leipzig', in which any of the individual terms (e.g. 'Bach', '0034X078') may be useful transaction features.

2. Best Mode of the Invention

FIG. 1 shows an overview of the best mode contemplated by the inventor of the process for unsupervised analytical review and anomaly detection according to the concepts of the present invention.

3. How to Make the Invention

As can be amply seen from FIG. 1, the process begins by the user specifying a dataset to be analyzed, as well as the columns that denote the transaction unique identifier, key for later graphical ordering of data (the 'ordering key'), transaction monetary amount, and columns containing unstructured text. These are the only inputs that need be specified by the user. In some cases, the user may not even need to specify the transaction unique identifier, ordering key, or monetary amount column as these may be self-evident from the data, for example if the dataset includes only one column whose data type could be an amount, or where the data type of columns indicates that are likely to contain unstructured text. Furthermore, financial data tends to follow predictable scale-invariant distributions (such as that observed in Benford's Law) and this may further narrow the possibilities for what can be the column associated with the monetary amount. Finally, it should be noted that the input 'dataset' should be interpreted broadly to include a database table, a database view, the output of a stored procedure, a spreadsheet, a text file, or a comma-separated file as non-exhaustive possibilities.

The next step is to enumerate all attributes [x] (excluding text attributes), where [x] is an attribute (corresponding to a column) in one dataset. The attributes are each associated with a cardinality: the number of distinct data values that occur for that attribute in the input dataset. Each attribute is also associated with an entropy: the attribute is treated as a probability distribution, where each attribute-value is an outcome, and the entropy is calculated over this distribution. For example, the distribution for attribute [account] in FIG. 2 has two associated attribute-values, XY001 and PQ002, therefore the cardinality of [account] here is 2. The probability distribution (based on frequencies) is ⅔ (the probability of XY001) and ⅓ (the probability of PQ002). The entropy of attribute [account] here is therefore—($⅓ \log ⅓ + ⅔ \log ⅔$), or approximately 0.276. The entropy can be based on monetary instead of, or in addition to, frequency distributions if desired. Finally, we calculate n, the number of rows in the dataset (here, 3).

The next step is to unpivot the dataset to create a sparse transaction-by-attribute/value matrix, as amply illustrated in FIG. 3 of the drawings. The matrix is sparse because most attribute/values will not occur in most transactions. A preferred method for unpivoting the dataset (which also provides a computationally explicit definition for the term 'unpivot') is to use an UNPIVOT statement in Transact-SQL, the version of Structured Query Language available from Microsoft Corporation, Redmond, Wash. In unpivoting the dataset, one should ignore attributes where the cardinality is zero (these correspond to columns which have no data in them), or 1 (these correspond to columns which have the same value throughout, which makes the attributes non-distinguishing), or equal to n from paragraph [0048] (these correspond to columns where the value in every row is different, which again make the attributes non-distinguishing). Also ignored are unstructured text attributes as determined in paragraph [0047], because these are better treated separately in paragraph [0050] below. Finally, for each group of attributes with identical entropy, one can ignore all but one attribute from the group; once one attribute in the group is considered, the others by definition add no further distinguishing information.

For extraction of features from a transaction description (or other unstructured text), a text tokenizer is required. An example of a preferred method for text tokenization would be the regular expressions Regex.Split method used in conjunction with "\w" (the non-word character delimiter). This method can be applied to virtually any human language encoded in any Unicode script, making it particularly useful, for example, with transaction descriptions which tend to be expressed in human-readable language. If the source transactional data is in a Microsoft SQL Server 2005 or 2008 database (available from Microsoft Corporation, Redmond, Wash.), then a highly efficient way of tokenizing text fields is to implement the regular expressions method above within a Common Language Runtime database function which can then be referenced within an SQL (Structured Query Language) database query. Within other database management systems, there are likely to be equivalent methods for text tokenization. The text tokenizer converts text within transaction descriptions from the format shown in FIG. 2 to a format where each word within the text is a separate text token, which in turn can be treated as attribute/values, greatly facilitating further data manipulation. The output of this conversion process (inter alia) is shown in FIG. 4 of the drawings.

FIG. 4 illustrates how both the extraction of words from text and use of other attributes (in this case [account] and [date]) can be accommodated within a single framework. As long as each transaction has at least one feature, there is no theoretical lower or upper limit on how many features or attribute-values may be included.

The method for analytical review and anomaly detection incorporates the use of a weighting scheme to measure and combine (1) the distinctiveness of particular attribute/values (to include words from text or other features) in particular transactions, and (2) the materiality of the transaction. The weights for (1) and (2) can be added together to form a combined weight.

To measure the distinctiveness of particular attribute/values (referred to herein as the 'distinctiveness weight'), a preferred weighting scheme would be based on information theory and an example would be Pointwise Mutual Information, which can be defined as the log-probability of attribute/values i in (or conditional upon) transaction j, less the log-probability of attribute/values i occurring in the entire population. In effect, this weighting scheme measures how much more likely an attribute/values is to occur in conjunction with a particular transaction than may be expected on the basis of chance. A formula for Pointwise Mutual Information is shown in FIG. 4, along with sample results of applying this weighting to features from tokenized text and attribute/values. The most distinctive attribute/values (including words) for the transaction are assigned higher weightings, while attribute/values which are non-distinctive are assigned lower weightings. Use of a weighting scheme in this fashion is resilient to typographical and other encoding errors in the source data, and will automatically recognize which attribute/values are most distinguishing within a particular population, without any a priori knowledge of the characteristics of the population. This is a key reason that the present invention is highly generalizable to different datasets.

The weight that measures the materiality of the transaction (referred to herein as the 'materiality weight') is the logarithm of the absolute value of the transaction's monetary amount; thus, the weight for a $10 credit (−$10) would be log(10). The logarithm can be computed in any base, but the same base should be used in the calculation of both the first and second weights. Transactions with a monetary value of zero can be ignored since by definition these have no financial effect. Note that because financial data (as other data) tends to follow scale-invariant distributions, where the logarithm of the ranking order of transactions (in order of monetary amount) is generally proportional to the logarithm of the monetary amount—a fact which contributes to the working of Benford's Law—the weighting for materiality, like that for attribute/value distinctiveness above, requires no a priori knowledge of the characteristics of the population and enables the present invention to generalize to different datasets.

The materiality weight is added to each non-zero distinctiveness weight for a particular transaction, yielding a weight which combines materiality and distinctiveness, herein referred to as the 'combined weight'.

Once the transaction attribute/values are extracted and weighting is assigned, the method for analytical review and anomaly detection conceives of the transactions as being associated with k-dimensional vectors in a Euclidean space, where k is the number of distinct attribute/values in the entire population. For a particular transaction, the k-dimensional vector is the list of attribute/values, each associated with the combined weight for that transaction and attribute/value. This conception allows natural clusters of transactions to be found in the k-dimensional space, as illustrated in FIG. 5 of the drawings.

All the transaction vectors together form a transaction-by-attribute/value matrix of size n by k, referred to as the 'X matrix'. The next step is reduce the dimensionality of the X matrix to find its principal components. A preferred method for dimensionality reduction is Singular Value Decomposition ('SVD'), although other dimensionality reduction techniques, including but not limited to Non-Negative Matrix Factorization, Latent Dirichlet Allocation, and PARAFAC can be used. An advantage of using SVD is that the dimensions of the output are orthogonal to one another, and this is optimal when the cosine similarity metric mentioned in [0056] is used. Furthermore, SVD has been shown to work well with the pointwise mutual information weighting described in [0053].

A detailed discussion of how SVD is computed on a matrix is beyond the scope of the instant disclosure, but SVD in general is well known in the art of linear algebra. However, it is sufficient for the instant disclosure to note that the output of SVD when applied to the transaction-by-attribute/value matrix comprises three matrices: a concept-by-attribute/value matrix, herein referred to as the 'U matrix', a diagonal matrix of singular values, herein referred to as the 'S matrix', and a transaction-by-concept matrix, herein referred to as the 'V matrix'. The 'S matrix' lists the weights of the principal (orthogonal) components of the transaction-by-attribute/value matrix, in order of most important first. The product of the U matrix, S matrix and V matrix is equal to the X matrix. The 'concepts' of the U matrix and V matrix correspond in a one-to-one fashion to the principal components found by SVD, and to the orthogonal dimensions referred to in [0059].

In practice, it is useful to compute a truncated SVD, where the number of concepts, x, is smaller than the lesser of (1) the number of attribute/values and (2) the number of transactions. The truncated SVD finds the x most important principal components or concepts in the X matrix. The value of the truncated SVD is that first that it filters out noise in the source data, allowing the auditor to use the output to examine just the most important signals in the data. Secondly, a truncated SVD is easier to compute than a full SVD. Truncated SVD outputs a truncated U matrix, truncated S matrix and truncated V matrix where the rows and columns correspond only to the x most important principal components in the X matrix. When multiplied together, the truncated U matrix, truncated S matrix and truncated V matrix provide the best possible approximation to the X matrix in x orthogonal dimensions.

The truncated V matrix effectively lists the importance of each transaction in each of the x dimensions. Similarly, the truncated U matrix lists the importance of each attribute/value in each of the x dimensions. For example, if the most significant pattern in the accounting dataset being analyzed is payroll transactions, any payroll transactions will tend to have high values in the first row of the truncated V matrix, and any attribute/values that relate to payroll (such as a payroll account number) will tend to have high values in the first column of the truncated U matrix. By representing the truncated V matrix as a series of scatterplots, material patterns and anomalies can be quickly identified by an auditor. In the series of scatterplots, a single scatterplot is created for each dimension of the truncated SVD, in which each data point is a transaction, the y-axis corresponds to the numerical entry for the given transaction and dimension in the truncated V matrix, and the x-axis corresponds to the ordering key specified by the user in [0047], typically but not necessarily a transaction date.

By joining the truncated U and V matrices to tables listing the transactions and attribute/values, the meaning of each dimension of the truncated SVD can be explained as shown in FIG. 7 of the Drawings, clarifying what the patterns and anomalies in the scatterplots relate to.

The processes explained above may constitute computer-executable instructions embodied or stored within a machine-readable storage medium, that when executed by a machine will cause the machine (e.g. computer, processor, etc.) to perform the operations described. Additionally, the processes may be embodied within hardware, such as an application specific integrated circuit ("ASIC") or the like.

A machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g. read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

4. How to Use the Invention

The method for analytical review and anomaly detection is designed to be 'unsupervised', meaning that very little user intervention is necessary. This in turn leads to a significant savings in labor compared to existing methods. If the method is implemented as computer-executable instructions embodied or stored within a machine-readable storage medium, the user need at most specify (e.g. through a user interface) which dataset is to be used as input, which column of the dataset represents the monetary amount, which column of the dataset represents the transaction identifier, and which column is to be used for graphical ordering, and the machine will output (1) a series of scatterplots and (2) tabular data explaining which transactions and attribute/values most prominently define each dimension and therefore scatterplot. An auditor can review these outputs to identify material patterns and anomalies quickly in the accounting data.

If there are patterns and anomalies that cannot readily be explained, the auditor can use the outputs listed in [0065] to identify particular transactions or groups of transactions of interest. These transactions can then be subjected to closer audit scrutiny; for example, the auditor can request that supporting documentation be provided for the transactions of interest.

The problems addressed by the method for analytical review and anomaly detection are many as can be easily seen by those skilled in the art. The method for analytical review and anomaly detection is not restricted to working with data in a particular format or even text in a particular human language. It is not limited in terms of the number or type of features that transactions may have. It is not limited by size of dataset, and in fact is anticipated to provide increasingly greater efficiencies and savings with larger datasets. It avoids the need for specifying heuristics particular to individual datasets. Because it is scalable and dataset-independent, it can be relied upon to produce results which exceed the capabilities of a human, since the algorithm is able to gain a 'global' picture of similarities between transactions that a human could not achieve for large datasets. The present invention can dramatically reduce the amount of labor, and therefore the costs, associated with analytical review and anomaly detection, particularly on a large scale. Since analytical review and anomaly detection are basic audit functions, the present invention has widespread uses.

Thus it will be appreciated by those skilled in the art that the present invention is not restricted to the particular preferred embodiments described with reference to the drawings, and that variations may be made therein without departing from the scope of the present invention as defined in the appended claims and equivalents thereof.

What is claimed is:

1. A computer implemented method of unsupervised financial analytical review, comprising:
    extracting features, by a computer having stored a financial dataset, of each transaction in the financial dataset;
    generating, by the computer, a transaction-by-attribute/value matrix from the extracted features of each transaction in the financial dataset;
    calculating, by the computer, distinctiveness weights for each attribute/value in the transaction-by-attribute/value matrix, wherein the distinctiveness weights signify how much more likely an attribute/value is to occur in conjunction with a particular transaction than may be expected on the basis of chance;
    calculating, by the computer, materiality weights for each attribute/value in the transaction-by-attribute/value matrix, wherein the materiality weights signify an importance or significance of an amount, transaction or discrepancy with a particular transaction;
    calculating, by the computer, combined weights for each attribute/value in the transaction-by-attribute/value matrix, wherein the combined weight is calculated by adding each of the materiality weights for each attribute/value in the transaction-by-attribute/value matrix to respective distinctiveness weights not equal to zero of the distinctiveness weights for each attribute/value in the transaction-by-attribute/value matrix;
    applying, by the computer, the combined weights to the transaction-by-attribute/value matrix to generate a weighted transaction-by-attribute/value matrix;
    factorizing, by the computer, the weighted transaction-by-attribute/value matrix into a transaction-by-concept matrix; and
    generating, by the computer, output of the transaction-by-concept matrix enabling significant patterns and trends to be identified;
    wherein the extracting, the generating of the transaction-by-attribute/value matrix, the calculating of the distinctiveness weights, the calculating of the materiality weights, the calculating of the combined weights, the applying of the combined weights, the factorizing, and the generating of the output are performed regardless of a number, type, or monetary amount of transactions in the financial dataset, regardless of a number or type of features associated with each transaction in the financial dataset, and regardless of a provenance of the financial dataset.

2. The computer implemented method of claim 1, wherein extracting features of each transaction in the dataset comprises unpivoting the dataset to create a list of transactions associated with attribute/values.

3. The computer implemented method of claim 1, wherein extracting features comprises:
    tokenizing contents of fields in the dataset which contain unstructured text to create a list of transactions associated with text tokens; and
    treating the text tokens as attribute/values.

4. The computer implemented method of claim 1, wherein generating a transaction-by-attribute/value matrix comprises:
listing unique transactions along one axis of the transaction-by-attribute/value matrix;
listing unique attribute/values along another axis of the transaction-by-attribute/value matrix; and
populating the transaction-by-attribute/value matrix with non-zero values recording a number of times particular attribute/values occur in conjunction with particular transactions.

5. The computer implemented method of claim 1, wherein calculating the distinctiveness weights comprises measuring pointwise mutual information between respective transactions and attribute/values which occur in conjunction with one another.

6. The computer implemented method of claim 1, wherein calculating the materiality weights comprises using a logarithm of each transaction's absolute monetary amount, for transactions with a non-zero monetary amount.

7. The computer implemented method of claim 1, wherein factorizing the weighted transaction-by-attribute/value matrix comprises:
performing a truncated or full singular value decomposition on the weighted transaction-by-attribute/value matrix; and
generating the transaction-by-concept matrix as an output of the truncated or full singular value decomposition.

8. The computer implemented method of claim 1, wherein generating output comprises:
creating a series of scatterplots, one per concept;
creating one axis for each scatterplot in the series of scatterplots to correspond to a logical ordering of transactions;
creating another axis for each scatterplot in the series of scatterplots to correspond to importance in the concept; and
representing transactions as individual points on the series of scatterplots.

9. The computer implemented method of claim 1, wherein generating output comprises creating a table of transactions which lists importance of the transactions in each dimension of the transaction-by-concept matrix.

10. A computer implemented method of unsupervised financial anomaly detection, comprising:
extracting, by a computer having stored a financial dataset, features of each transaction in the financial dataset;
generating, by the computer, a transaction-by-attribute/value matrix from the extracted features of each transaction in the financial dataset;
calculating, by the computer, distinctiveness weights for each attribute/value in the transaction-by-attribute/value matrix, wherein the distinctiveness weights signify how much more likely an attribute/value is to occur in conjunction with a particular transaction than may be expected on the basis of chance;
calculating, by the computer, materiality weights for each attribute/value in the transaction-by-attribute/value matrix, wherein the materiality weights signify an importance or significance of an amount, transaction or discrepancy with a particular transaction;
calculating, by the computer, combined weights for each attribute/value in the transaction-by-attribute/value matrix, wherein the combined weight is calculated by adding each of the materiality weights for each attribute/value in the transaction-by-attribute/value matrix to respective distinctiveness weights not equal to zero of the distinctiveness weights for each attribute/value in the transaction-by-attribute/value matrix;
applying, by the computer, the combined weights to the transaction-by-attribute/value matrix to generate a weighted transaction-by-attribute/value matrix;
factorizing, by the computer, the weighted transaction-by-attribute/value matrix into a transaction-by-concept matrix; and
generating, by the computer, output of the transaction-by-concept matrix enabling anomalies to be identified;
wherein the extracting, the generating of the transaction-by-attribute/value matrix, the calculating of the distinctiveness weights, the calculating of the materiality weights, the calculating of the combined weights, the applying of the combined weights, the factorizing, and the generating of the output are performed regardless of a number, type, or monetary amount of transactions in the financial dataset, regardless of a number or type of features associated with each transaction in the financial dataset, and regardless of a provenance of the financial dataset.

11. The computer implemented method of claim 10, wherein extracting features of each transaction in the financial dataset comprises unpivoting the financial dataset to create a list of transactions associated with attribute/values.

12. The computer implemented method of claim 10, wherein extracting features comprises:
tokenizing contents of fields in the financial dataset which contain unstructured text to create a list of transactions associated with text tokens; and
treating the text tokens as attribute/values.

13. The computer implemented method of claim 10, wherein generating a transaction-by-attribute/value matrix comprises:
listing unique transactions along one axis of the transaction-by-attribute/value matrix;
listing unique attribute/values along another axis of the transaction-by-attribute/value matrix; and
populating the transaction-by-attribute/value matrix with non-zero values recording a number of times particular attribute/values occur in conjunction with particular transactions.

14. The computer implemented method of claim 10, wherein calculating the distinctiveness weights comprises measuring pointwise mutual information between respective transactions and attribute/values which occur in conjunction with one another.

15. The computer implemented method of claim 10, wherein calculating the materiality weights comprises using a logarithm of each transaction's absolute monetary amount, for transactions with a non-zero monetary amount.

16. The computer implemented method of claim 10, wherein factorizing the weighted transaction-by-attribute/value matrix comprises:
performing a truncated or full singular value decomposition on the weighted transaction-by-attribute/value matrix; and
generating the transaction-by-concept matrix as an output of the truncated or full singular value decomposition.

17. The computer implemented method of claim 10, wherein generating output comprises:
creating a series of scatterplots, one per concept;
creating one axis for each scatterplot in the series of scatterplots to correspond to a logical ordering of transactions;

creating another axis for each scatterplot in the series of scatterplots to correspond to a range of values in the output of factorization; and representing transactions as individual points on the series of scatterplots.

18. The computer implemented method of claim 10, wherein generating output comprises tabulating transactions in order of their importance in each dimension of the transaction-by-concept matrix.

19. A method of unsupervised financial analytical review and anomaly detection, comprising the steps of:

extracting features, by a computer having stored a financial dataset, of each transaction in the financial dataset;

generating, by the computer, a transaction-by-attribute/value matrix from the extracted features of each transaction in the financial dataset;

calculating, by the computer, distinctiveness weights for each attribute/value in the transaction-by-attribute/value matrix, wherein the distinctiveness weights signify how much more likely an attribute/value is to occur in conjunction with a particular transaction than may be expected on the basis of chance;

calculating, by the computer, materiality weights for each attribute/value in the transaction-by-attribute/value matrix, wherein the materiality weights signify an importance or significance of an amount, transaction or discrepancy with a particular transaction;

calculating, by the computer, combined weights for each attribute/value in the transaction-by-attribute/value matrix, wherein the combined weight is calculated by adding each of the materiality weights for each attribute/value in the transaction-by-attribute/value matrix to respective distinctiveness weights not equal to zero of the distinctiveness weights for each attribute/value in the transaction-by-attribute/value matrix;

applying, by the computer, the combined weights to the transaction-by-attribute/value matrix to generate a weighted transaction-by-attribute/value matrix;

factorizing, by the computer, the weighted transaction-by-attribute/value matrix into a transaction-by-concept matrix; and generating, by the computer, output of the transaction-by-concept matrix so as to transform the financial dataset into useful actionable information enabling identification of transactions or groups of transactions that merit closer scrutiny;

wherein the extracting, the generating of the transaction-by-attribute/value matrix, the calculating of the distinctiveness weights, the calculating of the materiality weights, the calculating of the combined weights, the applying of the combined weights, the factorizing, and the generating of the output are performed regardless of a number, type, or monetary amount of transactions in the financial dataset, regardless of a number or type of features associated with each transaction in the financial dataset, and regardless of a provenance of the financial dataset.

* * * * *